United States Patent [19]

Polard et al.

[11] 4,139,492

[45] Feb. 13, 1979

[54] HYDROTREATING CATALYSTS

[75] Inventors: Ronald J. Polard, Trumbull; John D. Voorhies, New Canaan, both of Conn.

[73] Assignee: American Cyanamid Company, Stamford, Conn.

[21] Appl. No.: 823,317

[22] Filed: Aug. 10, 1977

[51] Int. Cl.$^2$ .......................... B01J 21/02; B01J 35/00
[52] U.S. Cl. ............................... 252/433; 252/477 R
[58] Field of Search ........................... 252/433, 477 R

[56] References Cited

U.S. PATENT DOCUMENTS

| | | | |
|---|---|---|---|
| 2,284,554 | 5/1942 | Beyerstedt | 252/433 X |
| 3,857,780 | 12/1974 | Gustafson | 252/477 R X |
| 3,915,843 | 10/1975 | Franck et al. | 252/433 X |
| 3,984,352 | 10/1976 | Rodewald | 252/433 X |
| 4,025,459 | 5/1977 | Wristers | 252/433 X |
| 4,036,737 | 7/1978 | Wristers et al. | 252/433 X |

FOREIGN PATENT DOCUMENTS 1283201  11/1968  Fed. Rep. of Germany ........... 252/433

*Primary Examiner*—Delbert E. Gantz
*Assistant Examiner*—William G. Wright
*Attorney, Agent, or Firm*—Gordon L. Hart

[57] ABSTRACT

Catalysts for hydrotreating of petroleum refinery feedstocks are prepared by impregnating an aqueous solution of Group VI metal compound and Group VIII metal compound in solution with $HBF_4$ on catalyst support of alumina or alumina with silica. In preferred embodiments, oxides of molybdenum and nickel in solution with $HBF_4$, and optionally also with $H_3PO_4$, are impregnated on alumina and calcined to finish the catalyst. Catalysts so prepared are used in hydrotreating to reduce nitrogen content of oil feedstocks.

13 Claims, No Drawings

HYDROTREATING CATALYSTS

The invention relates to improvements in the manufacture of catalysts and to improved catalyst compositions and to improvements in the use of catalysts for hydrotreating of petroleum refinery stocks.

A variety of hydrotreating processes, such as hydrodesulfurization, hydrodenitrogenation, hydrocracking, and the like have been described, wherein a refinery feedstock is contacted with hydrogen in presence of a catalyst to effect the desired reaction of hydrogen with components in the feedstock. Selection of suitable reaction conditions will effect the desired reactions. Preferred hydrotreating catalysts comprise compounds of at least one compound of Group VI metal and at least one compound of a Group VIII metal on a support of alumina or alumina with silica. Catalysts comprising molybdenum with cobalt or nickel are the most widely used for this purpose.

According to the invention hydrotreating catalysts of the kind described are prepared by impregnating a suitable support with a solution containing at least one compound of the selected promoter metals in aqueous solution with $HBF_4$. In this solution, the $HBF_4$ may be present as a solubilizing agent and solution stabilizer to enhance solubility of the metal compounds, as demonstrated in some of the examples below, or it may be added to a solution of the metal compounds already dissolved with phosphoric acid which serves in the solution as a stabilizer or into a solution of one of the compounds without need for a stabilizer. In the catalysts, the calcination residue from $HBF_4$ in the impregnating solution will enhance the catalytic hydrotreating activity as demonstrated in examples below using the catalysts for hydrodenitrogenation (HDN) of certain petroleum refinery stocks. The invention contemplates the use of an amount of $HBF_4$ in such impregnating solutions which will be sufficient to improve the catalytic activity of catalyst made from the solution. Usually, an amount of $HBF_4$ in the range from 2 to 6% based upon the fluorine content of finished catalyst, will accomplish the purpose of the invention. In the first four examples below, catalysts are prepared from solutions of a compound of a Group VI metal, e.g. molybdenum oxide, and a compound of a Group VIII metal, e.g. nickel oxide, using $HBF_4$ in the solution to promote the solubility of the metal compounds and to stabilize the solutions. Catalysts prepared from these solutions are shown to have improved catalytic activity for hydrotreating by comparison with the use of comparable catalysts made from solutions of the same metals stabilized with phosphoric acid without $HBF_4$.

EXAMPLE 1

A single solution containing dissolved nickel oxide, $MoO_3$ and $HBF_4$ was prepared by heating at reflux, a mixture of the following components:
  450 grams $H_2O$
  150 grams $MoO_3$ (99.7%)
  50 grams $NiCO_3$ (55% NiO)
  79 grams 49% $HBF_4$ (in $H_2O$)
for 24 hours until a clear green solution was obtained. A solution of 554 ml. was recovered having a specific gravity of 1.314 grams/ml., 0.27 gram $MoO_3$/ml. and 0.054 gram NiO/ml.

EXAMPLE 2

Three catalysts were prepared using precalcined supports of extruded Bayer process precipitated alumina shaped as trilobal extrudates as described in U.S. Pat. No. 3,966,644. The supports were impregnated by pore volume saturation with impregnating solutions containing all of the promoter metals in a single solution. Catalyst A was prepared using the solution from Example 1. Catalysts B and C were prepared for comparison from conventional $NiO$—$MoO_3$—$H_3PO_4$ solutions. The impregnated supports were dried and calcined. The promoter compositions of the three catalysts after calcination at 900° F. for 1 hour are shown in Table I.

EXAMPLE 3

Catalysts A and B were tested for activity in a process of hydrodenitrogenation (HDN) of a gas oil feedstock having the following properties:

| Feedstock No. 1 | |
|---|---|
| API gravity (60%) | 23.5 |
| Carbon (%) | 87.1 |
| Hydrogen (%) | 11.5 |
| Sulfur (%) | 1.35 |
| Basic Nitrogen (ppm) | 284 |
| Total Nitrogen (ppm) | 1455 |
| Distillation (D1160) (° F) | |
| Initial B.P. | 463 |
| (5%) | 524 |
| (50%) | 635 |
| End B.P. | 870 |

After presulfiding a 45 gram catalyst charge with 10% $H_2S$/90% $H_2$ (max. temp. 725° F.) in a downflow trickle bed reactor, oil and hydrogen were introduced and reactor conditons were adjusted to 700° F., 1000 psi (4883 Pa), WHSV = 4.0 hours$^{-1}$, $H_2$ flow 2000 SCF/bbl. Percent conversion of basic and total nitrogen to ammonia under these conditions are shown in Table II.

On a weight basis, Catalyst A was 25 to 40% more active than Catalyst B, based on comparison of first order rate constants for HDN. On a volume basis Catalyst A (compacted bulk density = 0.77 g/cc) was 30 to 45% more active than Catalyst B (compacted bulk density 0.73 g/cc).

EXAMPLE 4

Catalysts A and C were tested for HDN activity on a feedstock high in olefins containing coker gas oil and having the following properties:

| Feedstock No. 2 | |
|---|---|
| API gravity (60° F) | 23.7 |
| Olefins (%) | 10.6 |
| Sulfur (%) | 1.36 |
| Basic Nitrogen (ppm) | 899 |
| Total Nitrogen (ppm) | 2664 |
| Distillation (D1160) (° F) | |
| Initial B.P. | 378 |
| 5% | 438 |
| 50% | 693 |
| End B.P. | 864 |

Catalyst charge, presulfiding and reactor configuration were the same as Example 3. Operating conditions were 715° F., 1000 psi (4883 Pa), WHSV = 2.0 hours$^{-1}$, $H_2$ flow 2000 SCF/bbl.

Percent conversions of basic and total nitrogen to ammonia under these conditions are shown in Table 2.

On a weight basis Catalyst A was about 30% more active than C.

In Examples 5-7 below, the catalyst solutions are prepared by first solubilizing molybdenum trioxide and nickel oxide using phosphoric acid to promote solubility and stabilize the solution. The $HBF_4$ is added to the solution before impregnation. This technique has the advantage that a solution of metal compounds can be made up and stored in vessels that might be corroded by an $HBF_4$ solution. The $HBF_4$ can be added easily when the time comes to use the solution for impregnating the catalyst support.

EXAMPLE 5

A single solution containing dissolved nickel oxide $MoO_3$, $HBF_4$ and some $H_3PO_4$ was prepared in two steps:

| | |
|---|---|
| (1) | 750 g $MoO_3$ |
| | 140 g 86% $H_3PO_4$ |
| | 1500 g $H_2O$ |
| | heat to reflux |
| | 175 g NiO added |
| | heat at reflux for 16 hours |
| | yield = 1765 cc solution, specific gravity |
| | = 1.487 g/cc |
| (2) | 200 cc solution (1) cooled to room temperature |
| | + 51 g 50% $HBF_4$ in water |
| | mix and dilute to 350 cc with water |

EXAMPLE 6

Catalyst D was prepared from solution (2) of Example 5 by pore volume saturation of the same alumina extrudate support used in Example 2. Final composition of Catalyst D after calcination at 900° F. for 1 hour is shown in Table I.

EXAMPLE 7

Catalyst D was compared with Catalyst B in the HDN activity test described in Example 3. Percent conversion of basic nitrogen compounds to ammonia under these conditions are shown in Table II.

On a weight and volume basis Catalyst D containing $HBF_4$ was about 45% more active than comparison Catalyst B containing no $HBF_4$, based on first order rate constants for the HDN reaction.

Catalysts A and D of the present invention containing $HBF_4$ are up to 45% more active than comparable catalysts made from Ni—Mo—$H_3PO_4$ solutions without $HBF_4$.

Table I

| Catalyst | % $MoO_3$ | % NiO | % $HBF_4$ | % P |
|---|---|---|---|---|
| A | 15.9 | 2.8 | 6.0 | 0 |
| B | 15 | 3 | 0 | 1.5 |
| C | 18 | 3.2 | 0 | 3.2 |
| D | 15 | 3.5 | 4.0 | 0.75 |

Table II

| Feedstock | Catalyst | Time on Stream hrs | Basic N Removed % | Total N Removed % |
|---|---|---|---|---|
| No. 1 | A | 14 | 84.4 | 83.9 |
| | | 32 | 84.9 | 84.6 |
| | B | 14 | 77.2 | 76.6 |
| | | 32 | 74.4 | 74.6 |
| | D | 14 | 87.0 | — |
| | | 32 | 88.4 | — |
| No. 2 | A | 20 | 80.3 | 76.8 |
| | C | 20 | 70.6 | 58.3 |

In Example 8 below, a molybdenum solution is impregnated on a support of alumina with silica during the catalyst making prior to any calcining. $HBF_4$ in aqueous solution with nickel is impregnated by a separate solution impregnation after the support containing molybdenum has been shaped and precalcined. Following the last impregnation, the support is again dried and calcined to finish the catalyst.

EXAMPLE 8

An alumina was precipitated over a heel of silica hydrogel. The resulting precipitate was washed free of salts. Ammonium heptamolybdate $[(NH_4)_6Mo_7O_{21}]$ and water were added to the washed aqueous slurry and the mixture was spray dried.

To (1 part) of the spray dried powder was added 1 part of water and 0.33 part of concentrated $HNO_3$. The ingredients were mixed together and then extruded using a die containing orifices in the "trilobal" shape. The extrudates were dried at 120° C. for 16 hours and then calcined at 650° C. for 1 hour.

An 800 gram portion of the calcined extrudates were impregnated with an aqueous solution containing 130 grams $Ni(NO_3)_2.6H_2O$ dissolved in 75 grams of aqueous 50% $HBF_4$ with $H_2O$ added to give pore volume saturation. The impregnated extrudates were dried at 120° C. for 16 hours and then calcined at 490° C. for 1 hour. The finished catalyst contains 3.5% NiO, 13% $MoO_3$ and 4% $HBF_4$.

This catalyst used in a hydrotreating test like those described above has higher denitrogenation activity than a comparison catalyst prepared the same except without $HBF_4$.

In the foregoing examples, the most preferred embodiments of the invention were described in detail using catalysts on high surface area alumina supports. Other high surface area supports are suitable for making hydrotreating catalysts in accordance with the inventions, and particularly we may use supports prepared from alumina or from alumina with silica. The solutions of promoter metals may be impregnated on precalcined shaped supports as in the preferred embodiments described, or they may be impregnated on the support material at an earlier stage in the preparation before the finished shaped support particle has been formed. The catalysts may be shaped as trilobal or other polylobal cross-section extrudates as described in U.S. Pat. No. 3,966,644 or other shapes such as cylinders, spheres or the like. The preferred temperature for calcining the catalyst after impregnation is about 900° F. for 1 hour but other calcining temperatures in the range from about 800° F. to about 1100° F. for times ranging from 0.5 to 2 hours as needed may be used.

In a most preferred catalyst according to the invention the ratio of molybdenum to nickel in the catalyst is in the range from 3.6 to 5.0 parts by weight $MoO_3$ to one part NiO. Other catalysts embodying the invention and containing from 2 to 8 parts by weight of Group VI B promoter metal to one part of Group VIII promoter metal, will be useful as catalysts for hydrotreating of petroleum oils.

The amount of $HBF_4$ needed for solubilizing the promoter metals will depend upon the selection of the promoter metal compounds for a particular solution. For making a solution of molybdenum oxide and nickel oxide, at least 0.1 parts by weight of $HBF_4$ per one part $MoO_3$ is needed to solubilize all of the molybdenum and nickel compounds. We prefer to use from 0.1 to 0.4 parts by weight of $HBF_4$ for each part by weight of $MoO_3$ when the acid is used to solubilize the metal compounds and stabilize the solution. For improvement of catalytic activity, amounts of $HBF_4$ in about the same range will be effective.

Compounds of Group VI B and Group VIII promoter metals which may be used for making the aqueous impregnating solutions are selected from compounds of the promoter metals which are sufficiently soluble in water, at least with the aid of $HBF_4$ or other acidic solubilizing agent. The amounts of the several metals in solution are sufficient to impregnate the support with the promoter metals in useful amounts. The promoter metal compounds must be oxides or compounds decomposable to oxides of the respective promoter metals by calcination of the impregnated catalyst, and must be compounds which will leave no harmful residue after calcination. The preferred Group VI metal is molybdenum and the preferred molybdenum compound for making the solutions is molybdenum trioxide. Other suitable Group VI B metal compounds suitable for use in accordance with the invention include $(NH_4)_2Mo_2O_7$ and $WO_3$. The preferred Group VIII metal is Nickel and the preferred nickel compound for making the solutions is nickel oxide. Other Group VIII metal compounds suitable for nickel carbonate and nickel nitrate.

The catalysts of the invention are useful in catalyst hydrotreating processes wherein hydrogen is reacted with a petroleum feedstock in presence of the catalyst at temperatures in the range from 500 to 800° F. and at pressures in the range from 200 to 3000 psi, and at hydrogen to oil ratio in the range from 200 to 5000 scf/bbl. The processes are most conveniently carried out in a fixed bed catalytic reactor but may also be carried out in a stirred ebulient bed or slurry reactor.

For hydrodenitrogenation reactions the process conditions described in Example 3 are preferred conditions but the denitrogenation reactions may be carried out at temperatures in the range from 600 to 800° F., and at pressures in the range from 500 to 3000 psi and with hydrogen to oil ratio in the range from 500 to 5000 scf/bbl.

I claim:

1. A process of making catalyst for catalytic hydrotreating of petroleum fractions wherein a catalyst support of alumina or alumina with silica is impregnated with compounds of at least one Group VI B metal and of nickel, at least one of said compounds being impregnated on said support in an aqueous solution containing an amount of $HBF_4$ sufficient to increase the catalytic hydrotreating activity of the catalyst, after which the impregnated support is dried and calcined to finish the catalyst.

2. A process of making catalyst for catalytic hydrotreating of petroleum fraction wherein a catalyst support of alumina or alumina and silica is impregnated with an aqueous solution comprising compounds of at least one Group VI B metal and of nickel dissolved in said solution with an amount of $HBF_4$ sufficient to increase the catalytic hydrotreating activity of the catalyst, and the impregnated support is dried and calcined to finish the catalyst.

3. A catalyst made by the improved process defined by claim 1.

4. An improved process defined by claim 2 wherein the Group VI B metal is molybdenum.

5. An improved process defined in claim 4 wherein the dissolved molybdenum compound is $MoO_3$.

6. An improved process defined by claim 5 wherein the dissolved nickel compound is nickel oxide.

7. An improved process defined by claim 5 wherein the ratio of $HBF_4$ to $MoO_3$ in said solution is in the range from 0.1 to 0.4 parts by weight $HBF_4$ to one part $MoO_3$.

8. A catalyst defined by claim 3 wherein the Group VI metal is molybdenum.

9. A catalyst defined in claim 8 wherein the ratio of molybdenum (Mo) to nickel (Ni) in said catalyst is about 3.5-6.1.

10. A process defined by claim 1 wherein the catalyst is shaped as a polylobal cross section extrudate.

11. A catalyst defined by claim 3 wherein the catalyst is shaped as a polylobal cross section extrudate.

12. A process defined in claim 7 wherein the catalyst is shaped as a polylobal cross section extrudate.

13. A process defined by claim 1 wherein the defined aqueous solution consists essentially of aqueous $HBF_4$ and a dissolved nickel compound and said solution is impregnated on a support which has been previously impregnated with molybdenum and then calcined, and following said $HBF_4$ and dissolved nickel impregnation, the support is again dried and calcined to finish the catalyst.

* * * * *